Sept. 25, 1951   E. C. MAYHEW   2,569,322
FISHING REEL
Filed Oct. 2, 1946

INVENTOR
ELTON C. MAYHEW
BY H. G. Manning
ATTORNEY

Patented Sept. 25, 1951

2,569,322

UNITED STATES PATENT OFFICE 2,569,322

FISHING REEL

Elton C. Mayhew, Torrington, Conn., assignor to The Sterling Manufacturing Company, Torrington, Conn., a corporation of Connecticut Application October 2, 1946, Serial No. 700,648

1 Claim. (Cl. 242—84.6)

This invention relates to angling apparatus, and more particularly to a fishing reel for use in fly casting.

An object is to provide an improved form of Z-shaped click spring which will be proof against breakage and will have longer life than previous types of click springs.

With this and other objects in view, there has been illustrated on the accompanying drawing, one form in which the invention may conveniently be embodied in practice.

Figure 1:
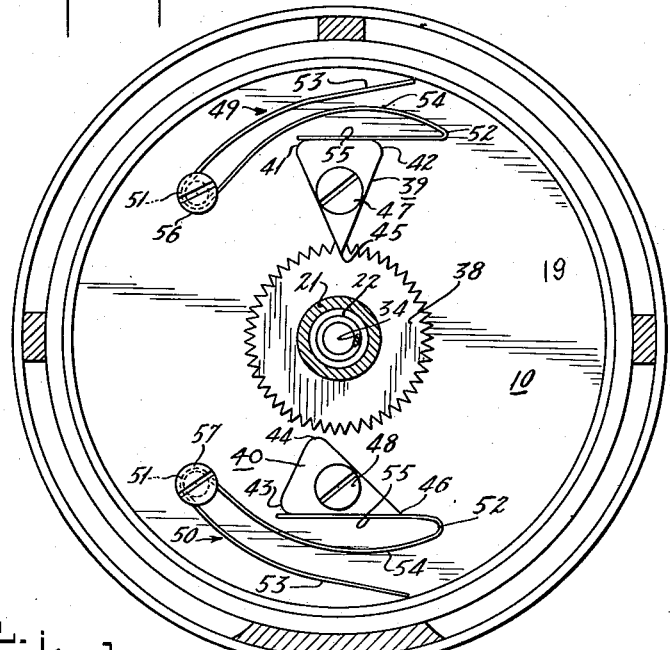
Fig. 1 represents a transverse sectional view of the improved fishing reel taken along the broken line 1—1 of Fig. 2, looking in the direction of the arrows, and showing one of the spring clicks in operating position, and the other spring click twisted 90 degrees into inactive position.

Referring now to the drawings in which like reference numerals denote corresponding parts throughout the several views, the numeral 10 indicates a spool of usual construction, having a hollow swiveled handle 11 near the outer end thereof, said handle being secured to said spool by a tapped stud 12 having a knurled inner end 13 embedded in the interior of said spool during the manufacture thereof.

The hollow handle 11 is adapted to be locked in position by means of a screw 14 having a head 15 and a screw driver kerf 16—said screw having a threaded inner section 18 engaged in a tapped outer section of the stud 12 and serving to hold the handle 11 against a shoulder 17 offset from the surface of the spool 10.

The spool 10 is adapted to rotate within a casing frame 19 provided on one side with a chair-holding rod plate 20 for attaching the frame 19 to a fishing rod (not shown).

The spool 10 is also provided with an interior hollow stainless steel bushing 21 rigidly mounted therein, and adapted to rotate upon a hollow stationary central shaft 22, which is provided with a knurled end 22a for rigidly connecting said shaft with the casing frame 19 during the manufacture thereof.

Figure 2:
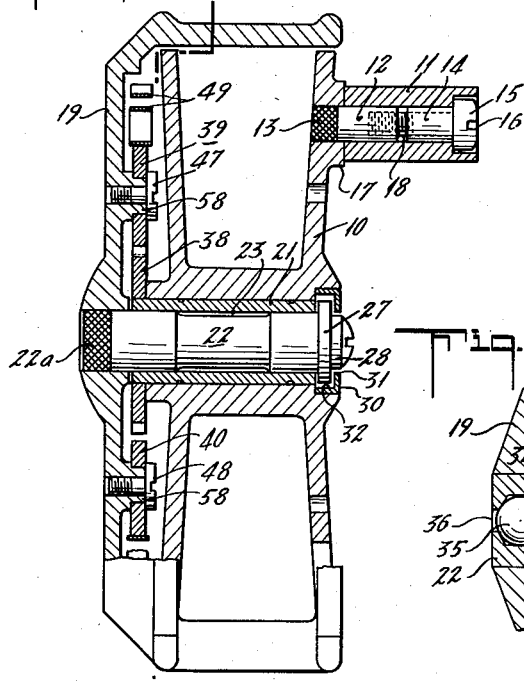
Fig. 2 is a longitudinal sectional view of the fishing reel taken through the handle, the spool, and the casing.
Figure 3:
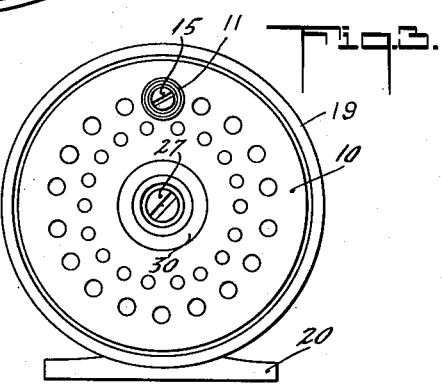
Fig. 3 is an end view of the fishing reel, shown on a smaller scale.
Figure 4:
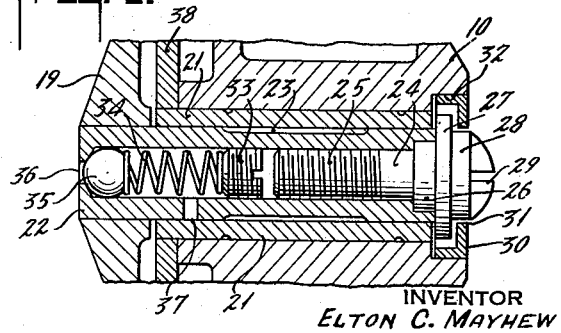
Fig. 4 is a fragmentary longitudinal enlarged sectional view of the central part of the fishing reel, showing the interior construction of the oil channel, the ball valve spring, the set screw, the spool screw, and the retaining cap for the latter.

The central portion of the hollow shaft 22 is provided on its surface with an elongated annular oil retaining groove 23 (see Figs. 2 and 4).

The spool 10 is adapted to be rotatably connected to the shaft 22 by means of an end screw 24 having a threaded section 25 engaged in the tapped interior of said shaft 22 (Fig. 4). The spool screw 24 has a shoulder 26 of slightly larger diameter than the threaded section 25 thereof, and a head 27 of still larger diameter. The head 27 is provided with a reduced outer end 28 having a kerf slot 29 for engagement by a screw driver or coin, for assembly or disassembly. The spool screw 24 is prevented from loss, in case it should accidentally become loose, by means of a protecting cup-shaped cap 30 having a central circular aperture 31 freely embracing a reduced end 28 of the screw head 27.

The cap 30 is adapted to lie flush with and is spaced from the reduced end 28 of the head 27, and as clearly shown on the drawing, the outer rim of said cap is fitted tightly within a counterbore 32 at the center of the spool 10.

Located in the tapped interior of the hollow shaft 22 is a short screw 33 which engages one end of a coiled spring 34—the other end of said spring engaging a ball valve 35 which seats in an oiling aperture 36 in the end of said shaft 22.

The hollow shaft 22 is provided with a transverse oil hole 37, which permits lubricating oil to flow outwardly to the exterior of said shaft into the interior of the bushing 21.

In order to produce the usual "clicking" sounds during the rotation of the spool 10 in either direction, provision is made of a click gear 38, rigidly mounted on the bushing 21, said click being engageable by a pair of clicks 39, 40, of generally triangular shape, as clearly shown in Fig. 1 of the drawing.

Each of the clicks 39, 40 is provided with rounded outer corners 41, 42, and 43, 44, and V-shaped gear-engaging points 45, 46, and said clicks are secured to said casing 19 by headed click screws 47, 48.

Each click 39, 40 is adapted to be engaged on its flat edges by an improved form of Z-shaped click springs 49, 50, which is provided with looped sections 51, 52, curved outer extremities 53, 53, curved intermediate sections 54, 54, and flat inner click-engaging sections 55, 55.

The click springs 49, 50 are adapted to be held in operating position upon the casing frame 19 by means of a pair of headed screws 56, 57, the heads of which engage in the looped sections 51 of said springs.

Under each of the clicks 39, 40, provision is made of friction-reducing bosses 58, 58, which are integral with the casing frame 19. Similar bosses (not shown) may also be employed, if desired, under the intermediate loop sections 51 of the springs 49, 50, for supporting the heads of the holding screws 56, 57.

It is to be noted that the springs 49, 50, being longer and freer than analogous springs employed in the art, have their stresses due to operation of the clickers spread over a much longer length, thereby minimizing the possibility of fatigue failure at any particular portion thereof. It is further to be noted that when the reel is rotated clockwise, (using the top click as in Fig. 1), the spring 49 pivots mostly at 52, whereas when rotated counter-clockwise, the spring action tends to take place at 56 and there is lesser bending at 52. By reason of this change of operation of the spring upon reversal of the reel the life of the spring is greatly enhanced. At the same time such a Z-shaped spring and pawl arrangement results in the desired two different degrees of drag on the reel, the stronger drag occurring when rotating the reel in a counter-clockwise direction, which is the direction of rotation for unwinding.

Operation

When it is desired to operate the fishing reel, the spool will be turned by means of the handle 11 for winding in or paying out the fish line, the action of the click springs 49, 50 being such that when the spool is turned rearwardly, more force will be required to operate the click than when it is turned forwardly as customary with fishing reels of this type.

One advantage of the present invention is that the fishing reel may easily be converted from right handed to left handed operation by turning both of the clicks 39, 40 through an angle of 90 degrees, it being understood that normally only one of said clicks will engage the click gear 38 at one time.

A further advantage is that by providing a pair of clicks in the reel, a spare click will always be on hand as said clicks are interchangeable.

The spring pressure on the oil-filling ball valve may be easily controlled by adjusting the position of the short screw 33.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a fly-casting reel, a casing frame, a central shaft secured thereto, a spool mounted to rotate on said shaft, a ratchet wheel rigidly carried on said spool, a substantially triangular flat click pawl pivotally mounted on said frame and disposed for coaction on an apex thereof with said ratchet wheel, abutment means on said frame, a double bent substantially Z-shaped flat spring, and means on said casing frame to retain one angle portion of said spring in substantially fixed relation to said frame, said spring and said retaining means being so disposed that the open end extremity of said spring extending from said retaining means engages said abutment means on said frame, and the other extremity of said spring engages the side of said click opposite said apex.

ELTON C. MAYHEW.

REFERENCES CITED

The following references are of record in the file of this patent:

UNITED STATES PATENTS

| Number | Name | Date |
|---|---|---|
| 771,318 | McNaughton | Oct. 4, 1904 |
| 782,130 | Hendryx | Feb. 7, 1905 |
| 1,358,382 | Mallow | Nov. 9, 1920 |
| 1,730,332 | Pfleuger | Oct. 1, 1929 |
| 1,871,386 | Pfleuger | Aug. 9, 1932 |
| 2,053,864 | Cook et al. | Sept. 8, 1936 |
| 2,059,765 | Adams | Nov. 3, 1936 |
| 2,086,782 | Schafer | July 13, 1937 |
| 2,158,597 | Watson | May 16, 1939 |
| 2,403,397 | Rankin | July 2, 1946 |

FOREIGN PATENTS

| Number | Country | Date |
|---|---|---|
| 21,131 | Great Britain | 1913 |